Dec. 16, 1969   P. E. HOVER   3,483,588
HINGE JOINT ASSEMBLIES BETWEEN TWO PANEL ELEMENTS
Filed July 6, 1967   2 Sheets-Sheet 1

Inventor
Per Elliott Hover

By Watson, Cole, Grindle + Watson
Attorneys

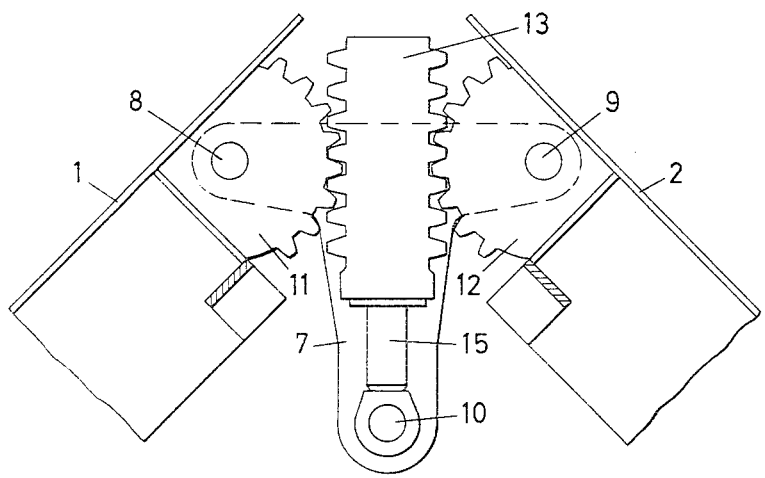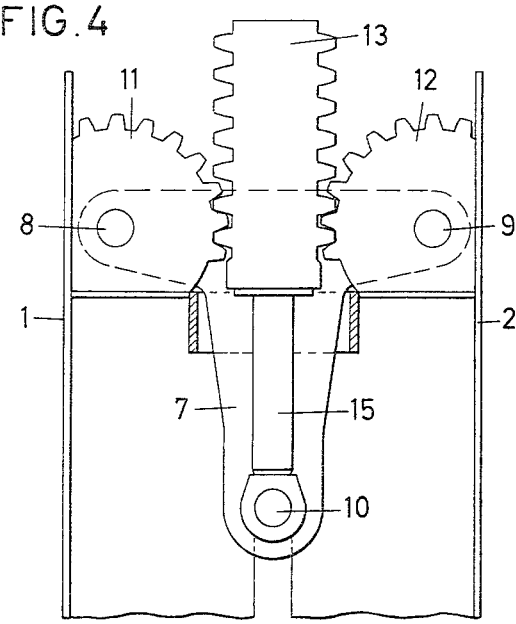

United States Patent Office 3,483,588
Patented Dec. 16, 1969

3,483,588
HINGE JOINT ASSEMBLIES BETWEEN
TWO PANEL ELEMENTS
Per E. Hover, Oslo, Norway, assignor to A. S. Kvaerner
Brug, Oslo, Norway
Filed July 6, 1967, Ser. No. 651,528
Claims priority, application Norway, July 8, 1966,
163,848
Int. Cl. E05d 3/08
U.S. Cl. 16—163                                        1 Claim

ABSTRACT OF THE DISCLOSURE

A hinge joint assembly interconnecting two panel elements, such as adjacent panels of a folding hatch cover, and comprising spaced, aligned gear segments secured one to each of the panel elements, includes a movable toothed element extending between and engaging each of the said two gear segments, the toothed element being movable in such a way as to cause the two gear segments to roll on the toothed element. Movement of the toothed element is produced by electric or fluid motor means.

The present invention relates to hinge joint assemblies between two panel elements, which are to be folded on to each other from one position, in which the two panels are situated in one and the same plane. Such a hinge joint assembly may, in particular, be applied to hatch cover elements in ships, or for use under other conditions in which space considerations dictate that the cover elements must be adapted to be stacked in a vertical position at one or both ends of the hatch, and to be easily brought into and out of covering position. In particular, the present assembly is adapted for use in such cases wherein no weatherproof joint is required between the cover elements when in covering position, such as in lower decks in ships.

In hinge joints between cover elements of this type, it has been suggested to use gear segments, each secured to one of the two cover elements and engaging each other, to the effect that a force applied in a direction at right angles to the panels, when in covering position, will cause the gear segments to roll on each other and thereby cause the panels to fold onto each other.

Such known joints require that the force which is to be applied, must be displaced continuously in a direction parallel to itself during the folding of the panels or cover elements towards one end of the hatch, and the unfolding of the elements, back to covering position, dictates the application of a horizontal pulling force on that edge of one of the panels which is not hingedly connected to the other.

It is an object of the present invention to provide a hinge joint assembly between two panel elements, which are to be folded onto each other from a position in one and the same plane, with the use of gear segments each of which is secured to one of the elements, and in which both the folding and the unfolding may be performed without using an exterior force applying means which must be displaced relatively to the hatch during the movements of the elements.

According to the invention, there is provided, between two gear segments which are mounted in one and the same plane, a toothed element which is in engagement with each of the gear segments and is adapted to be moved in such a manner that the two gear segments roll on the intermediate toothed element, so that folding or unfolding of the panels is effected exclusively by movement of the intermediate element, i.e. by means of an element which is permanently mounted between the panels and which, consequently, accompanies the same during their movement towards or away from the stacking end of the hatch.

Structurally, the intermediate element may be adapted to perform such a movement as to displace its teeth, in a direction at right angles to a line through the centres of the gear segments, relatively to a member which maintains the gear segments at a constant distance relative to each other. Thus, a structural member which interconnects the two panels at the centres of the gear segments, will form the permanent base of the movement of the intermediate element, irrespective of whether such element takes the form of a double sided tooth rack, a worm or a chain. The essential condition is that the rolling of the gear segments and thereby the folding and unfolding, respectively, of the panel elements is performed by means of an element which is permanently mounted between the panels, and by a rolling movement of the gear segments, to the effect that the movements of the panels become regular and equally proportioned to the two panels.

The movement of the intermediate element may be ensured in any convenient manner. By way of example, a hydraulic jack or motor, or an electric motor provided with a suitable gearing, may be adapted to a double sided tooth rack as well as to a chain, or to a worm, for movements in both directions.

The accompanying drawings schematically illustrate how the invention may be performed.

FIGURES 2 to 4 are side views of a system, including a double sided tooth rack, illustrating three stages of the panel movement.

Figure 1:
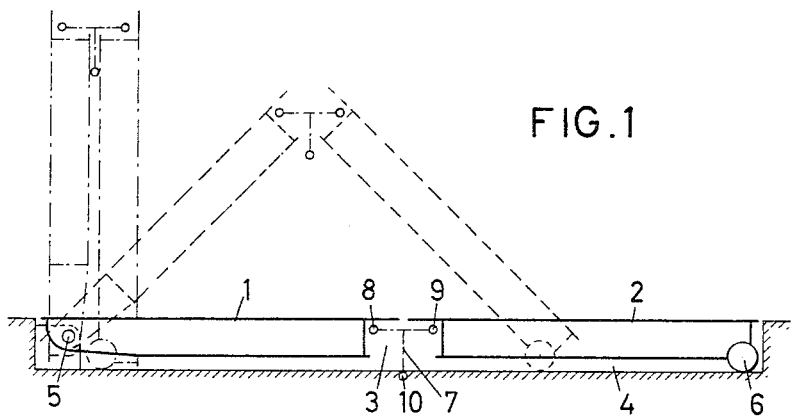
FIGURE 1 is a side view of an embodiment of a hatch cover system to which the assembly of the invention may be applied.

Reference is first made to FIG. 1, which shows a pair of panel formed elements 1 and 2, respectively, which are hingedly interconnected at 3, and which are to be moved from the unfolded position shown in full lines, in which the elements are positioned in one and the same plane and form a cover to a hatch 4, into a folded position shown in dot-and-dash lines at one end of the hatch, after having passed such positions as indicated in dash lines.

In the conventional manner in such systems of hingedly connected cover elements, the element 1 is pivotably mounted on a permanently mounted shaft 5 at one end of the hatch, while the second element 2 is provided with a roller 6. Thus, during its movements, the element 1 will pivot about the shaft 5, while the element 2 will roll along the hatch coaming through its roller 6.

The panel elements 1 and 2 are interconnected through a member which, in FIG. 1 is shown as being of generally T shape and which is designated 7. The points of connection between the element 7 and the elements 1 and 2 are shown at 8 and 9, respectively, and form the centres of gear segments, which are illustrated in detail in the succeeding figures, while the leg of the T member 7 is terminated at 10, which end forms the base of the intermediate element of the invention. As apparent from the drawing, the T member 7 moves in a direction parallel to itself during the entire movement of the elements 1 and 2 between the folded and unfolded positions, respectively.

Figure 2:
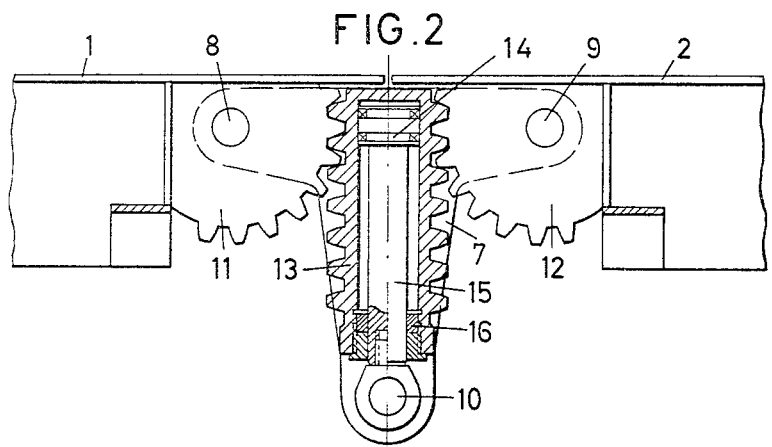

FIGURES 2, 3 and 4 are detail side views of one embodiment of the hinge assembly of the invention, each figure illustrating the conditions corresponding to one of the three positions of the elements 1 and 2 shown in FIG. 1. Thus, FIG. 2 corresponds to the position shown in full lines in FIG. 1. FIG. 3 corresponds to the position shown in dash lines, and FIG. 4 corresponds to the position shown in dot-and-dash lines.

As shown in FIGS. 2 to 4, gear segments 11 and 12 are mounted at the points 8 and 9, respectively, each gear segment being secured to the appropriate element 1 and 2, respectively, but pivotably connected to the T member 7. Between the gear segments 11 and 12, and in engagement with both, there is mounted a double sided tooth rack 13 which internally is formed as the cylinder of a hydraulically or pneumatically activated plunger 14, the plunger rod 15 of which is connected to the T member 7 at 10. The rod 15 is conventionally sealed by means of a washer 16 against the wall of the cavity of the tooth rack. The spaces to either side of the plunger 14 are connected to a source of hydraulic or pneumatic pressure, not shown in the drawings, to the effect that the tooth rack 13, upon opening of one or the other of such connections is moved in one direction or the other relatively to the plunger 14, i.e. in a direction at right angles to a line through the centres 8 and 9 of the gear segments 11 and 12 respectively. Due to the engagement between the teeth of the double sided tooth rack 13 and the two gear segments 11 and 12, such a movement of the tooth rack 13 will bring about a rolling movement of each of the gear segments on the tooth rack, and thereby a pivot movement of the two panel elements 1 and 2, towards or away from the folded position, respectively. During such pivot movements of the elements 1 and 2, a line through the points 8 and 9 remains horizontal, and the plunger rod 15 and the tooth rack 13 are constantly at right angles to the line through the points 8 and 9.

Obviously, the tooth rack shown in FIGS. 2 to 4, may be replaced by a chain, wherein the gear segments engage from opposite sides. In such embodiment, a pull will have to be applied from outside at the free end of the chain, and provision must be made for a drum arrangement, for the purpose of withdrawing the chain when the elements 1 and 2 are to be unfolded. Due to the fact that such a chain is flexible, the exteriorly applied pulling force is not necesarily to be applied in a direction at right angles to the line through the points 8 and 9, but may be applied, for instance by means of a cable running from a winch provided at the end of the hatch, while the winding drum of the chain is provided with a suitable motor system.

Figure 5:
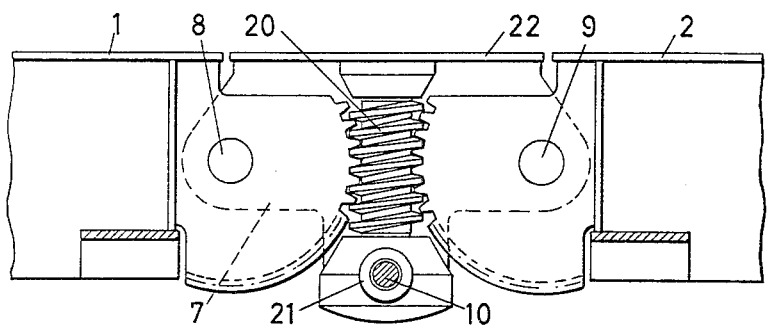
FIGURE 5 is a side view of a system, including a worm.

FIGURE 5 illustrates a further embodiment of the assembly of the invention, in which the intermediate element is in the form of a worm 20 which may be rotated in either direction by means of an electric, a hydraulic or a pneumatic drive system 21. At the opposite end, the worm is mounted in a plate 22 which covers the space between the edges of the two elements 1 and 2. The manner of operation of the system in this embodiment is the same as that described above with reference to FIGS. 1 to 4. However, due to the use of a worm, the teeth of the gear segments 11 and 12 will have to be oblique, corresponding to the pitch of the worm 21.

I claim:
1. A hinge joint assembly interconnecting two hatch cover elements for ships, or the like, which are to be folded onto each other from an aligned position and comprising spaced, aligned gear segments secured one to each of said elements near the topmost portion of each said element, each of said segments having an axis of rotation, a structural T-shaped member pivotally secured at each end of its cross-member to said segments at the respective axis of rotation of each said segment, and a movable toothed element on said T-shaped member lying between and in the common plane of the said two gear segments, said toothed element being in the form of a cylinder closed at one end and having mounted thereon a double sided tooth rack in operative engagement with both said gear segments, respectively, and means for moving said cylinder to cause said two gear segments to roll on said respective tooth racks and to pivot about their respective axes of rotation on each of said cross-member ends, a plunger rod mounted at one end to the stem portion of said T-shaped member, said rod lying axially within said cylinder and having a plunger mounted near its free end whereby, upon application of fluid pressure against said plunger, said cylinder is moved away from said fixed end so that said tooth racks are displaced in a direction at right angles to the axes of rotation of said gear segments.

References Cited
UNITED STATES PATENTS 1,186,977    6/1916    Elvin _____ 49—107
1,796,660    3/1931    Morse _____ 160—188

FOREIGN PATENTS 1,090,535    10/1960    Germany.

BOBBY R. GAY, Primary Examiner
DORIS L. TROUTMAN, Assistant Examiner